United States Patent
Oguchi et al.

(10) Patent No.: US 9,534,128 B2
(45) Date of Patent: Jan. 3, 2017

(54) INK JET INK COMPOSITION FOR SUBLIMATION TRANSFER, INK SET, AND METHOD OF MANUFACTURING DYED PRODUCT

(71) Applicant: Seiko Epson Corporation, Tokyo (JP)

(72) Inventors: Hideki Oguchi, Fujimi-machi (JP); Akihito Sao, Matsumoto (JP); Yasunari Ikeda, Shiojiri (JP); Miho Nakamura, Shiojiri (JP); Shinichi Naito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/540,345

(22) Filed: Nov. 13, 2014

(65) Prior Publication Data

US 2015/0130881 A1    May 14, 2015

(30) Foreign Application Priority Data

Nov. 13, 2013 (JP) ................ 2013-235131

(51) Int. Cl.
| | |
|---|---|
| *C09D 11/328* | (2014.01) |
| *C08K 5/18* | (2006.01) |
| *C08K 5/23* | (2006.01) |
| *C08K 5/3437* | (2006.01) |
| *C08K 5/54* | (2006.01) |
| *C08K 5/42* | (2006.01) |
| *C09D 11/54* | (2014.01) |
| *C09D 11/00* | (2014.01) |
| *C09D 11/40* | (2014.01) |

(52) U.S. Cl.
CPC .............. *C09D 11/328* (2013.01); *C08K 5/18* (2013.01); *C08K 5/23* (2013.01); *C08K 5/3437* (2013.01); *C08K 5/42* (2013.01); *C08K 5/5403* (2013.01); *C09D 11/005* (2013.01); *C09D 11/40* (2013.01); *C09D 11/54* (2013.01)

(58) Field of Classification Search
CPC .............. B41J 2/01; B41J 2/0057; B41J 2/05; B41J 2/1433; B41J 2/15; B41J 2/155; B41J 2/17; B41J 2/1755; B41J 2/17503; B41J 2/17593; B41J 2/21; B41J 2/211; B41J 2/2107; B41J 2/2114; B41J 2/2117; B41J 2/2056; B41J 11/0015; B41J 11/002; B41J 3/60; B41M 5/0011; B41M 5/0017; B41M 5/0256; B41M 5/52; B41M 5/5218; B41M 7/00; B41M 7/0072; B41M 7/0081; B41M 7/009; C09D 11/005; C09D 11/30; C09D 11/32; C09D 11/322; C09D 11/324; C09D 11/328; C09D 11/36; C09D 11/38; C09D 11/40; C09D 11/52; C09D 11/54; C09D 11/101
USPC ... 347/9–22, 56, 86, 88, 95–105; 106/31.13, 106/31.27, 31.6, 31.65, 31.85, 31.77, 106/31.75
See application file for complete search history.

(56) References Cited

U.S. PATENT DOCUMENTS

| | | | | |
|---|---|---|---|---|
| 5,382,561 A | * | 1/1995 | Mori ................ | B41M 5/345 428/913 |
| 8,263,682 B1 | * | 9/2012 | Papaiacovou ........ | C09D 11/328 428/212 |
| 9,109,327 B2 | * | 8/2015 | Mizutaki ............. | D06P 5/30 |
| 2005/0057631 A1 | * | 3/2005 | Morimoto ........... | C09B 67/0082 347/100 |
| 2008/0070009 A1 | * | 3/2008 | Akatani ............. | C09D 11/38 428/195.1 |
| 2011/0292114 A1 | * | 12/2011 | Sao .................. | C09D 11/328 347/20 |
| 2013/0205517 A1 | * | 8/2013 | Oguchi .............. | D06P 5/004 8/471 |

FOREIGN PATENT DOCUMENTS

| | | |
|---|---|---|
| JP | 2005-089499 A | 4/2005 |
| JP | 2011-021133 A | 2/2011 |

\* cited by examiner

*Primary Examiner* — Matthew Luu
*Assistant Examiner* — Sharon A Polk
(74) *Attorney, Agent, or Firm* — Nutter McClennen & Fish LLP; John J. Penny, Jr.; Alex Nagorniy

(57) ABSTRACT

An ink jet ink composition for sublimation transfer includes dye A and a dye B, in which the dye A is a disperse dye which has a molecular weight of 380 or less and an anthraquinone skeleton having a water-soluble group in a molecule, the dye B is a disperse dye which has a molecular weight of 400 or greater, and in the ink jet ink composition for sublimation transfer, dye solubility of the dye A is greater than dye solubility of the dye B.

17 Claims, No Drawings

INK JET INK COMPOSITION FOR SUBLIMATION TRANSFER, INK SET, AND METHOD OF MANUFACTURING DYED PRODUCT

BACKGROUND

1. Technical Field

The present invention relates to an ink jet ink composition for sublimation transfer, an ink set, and a method of manufacturing dyed products.

2. Related Art

In the ink jet recording method, a high-resolution image can be recorded with a relatively simple apparatus, and rapid development has been achieved in various fields. Among these, various studies have been made for the ink jet recording method using disperse dyes. For example, JP-A-2005-89499 discloses an ink for ink jet textile printing having dye solubility of $10^{-3}$ or less in an ink for ink jet textile printing containing at least a disperse dye, a dispersant, water, and a water-soluble organic solvent for the purpose of obtaining an ink for ink jet textile printing having high stability with less clogging and precipitation by increasing the particle diameters of disperse dye fine particles.

However, if the dye solubility is limited to $10^{-3}$ or less as disclosed in JP-A-2005-89499, the kinds of dyes satisfying such dye solubility are limited, and thus, it is difficult to obtain a desired hue. On the other hand, with regard to a disperse dye having relatively high solubility, crystallization occurs by leaving an ink composition to stand in a high-temperature environment, this acts as foreign matter, and thus clogging of ink jet nozzles is generated. Therefore, an ink composition having excellent discharging stability and clogging recoverability, by which hue can be properly adjusted relatively without limitation to the kind of a coloring material, is desired.

SUMMARY

An advantage of some aspects of the invention is to provide an ink jet ink composition for sublimation transfer having excellent discharging stability and clogging recoverability, by which desired hue can be obtained, an ink set including the ink jet ink composition for sublimation transfer, and a method of manufacturing dyed products using the ink jet ink composition for sublimation transfer.

The inventors use plural kinds of disperse dyes having different molecular weights in combination, thereby completing the invention.

[1] An ink jet ink composition for sublimation transfer including a dye A and a dye B, in which the dye A is a disperse dye which has a molecular weight of 380 or less and an anthraquinone skeleton having a water-soluble group in a molecule, the dye B is a disperse dye which has a molecular weight of 400 or greater, and in the ink jet ink composition for sublimation transfer, dye solubility of the dye A is greater than dye solubility of the dye B.

[2] The ink jet ink composition for sublimation transfer according to [1], in which in the ink jet ink composition for sublimation transfer, the dye solubility of the dye B is $10^{-3}$ or less.

[3] The ink jet ink composition for sublimation transfer according to [1] or [2], in which the dye B is a disperse dye which has the anthraquinone skeleton in a molecule.

[4] The ink jet ink composition for sublimation transfer according to any one of [1] to [3], in which the water-soluble group of the dye A is at least one kind selected from a group consisting of an amino group and a hydroxyl group.

[5] The ink jet ink composition for sublimation transfer according to any one of [1] to [4], in which the content of the dye B is 5% by mass to 20% by mass with respect to the total amount of the dye A.

[6] A method of manufacturing dyed products including attaching the ink jet ink composition for sublimation transfer according to any one of [1] to [5] on an intermediate transfer medium using an ink jet method, and transferring the disperse dye included in the ink jet ink composition for sublimation transfer to a recording medium by heating in a state in which a surface of the intermediate transfer medium on which the ink jet ink composition for sublimation transfer is attached and a dye surface of the recording medium face each other.

[7] The method of manufacturing dyed products according to [6], in which a heating temperature in the transferring is 160° C. to 220° C.

[8] An ink set including a first ink composition and a second ink composition, in which the first ink composition includes at least one kind of the ink jet ink composition for sublimation transfer according to any one of [1] to [5], the second ink composition is an ink jet black ink composition for sublimation transfer including at least one kind selected from a group consisting of a dye A which is a disperse dye which has a molecular weight of 380 or less and an anthraquinone skeleton having a water-soluble group in a molecule, a dye B which is a disperse dye which has a molecular weight of 400 or greater, and a dye C. The dye C is a disperse dye which has a molecular weight of 380 or less and does not have the anthraquinone skeleton having the water-soluble group in a molecule. In the second ink composition, dye solubility of the dye A is greater than dye solubilities of the dyes B and C, and dye solubility of the dye C is $10^{-3}$ or less.

[9] The ink set ink according to [8], in which the dye C has the anthraquinone skeleton not having the water-soluble group in a molecule.

DESCRIPTION OF EXEMPLARY EMBODIMENTS

Hereinafter, embodiments for carrying out the invention (hereinafter, referred to as "the embodiment") will be described in detail. Further, the invention is not limited thereto, and various modifications are possible without departing from the gist of the invention.

Ink Jet Ink Composition for Sublimation Transfer

The ink jet ink composition for sublimation transfer according to the embodiment includes a dye A and a dye B, in which the dye A is a disperse dye which has a molecular weight of 380 or less and an anthraquinone skeleton having a water-soluble group in a molecule, the dye B is a disperse dye which has a molecular weight of 400 or greater, and in the ink jet ink composition for sublimation transfer, dye solubility of the dye A is greater than dye solubility of the dye B.

The term "disperse dye" is a class of dyes which are difficult to dissolve in water. In addition, the disperse dye has a certain solubility with respect to a water-soluble organic solvent, a surfactant, and a part of other additives which are the ink composition, and it is possible to adjust the solubility of the disperse dye through a constitution ratio of an ink solution (ink composition not including a coloring material). Although the disperse dye is dispersed in a basically undissolved state in the ink solution, a trace amount of the disperse dye exists in a state of being dissolved. This disperse dye dissolved in the ink solution easily precipitates as foreign matter in the ink composition due to the influence of changes in state of the ink solution such as temperature changes of the ink solution, concentration changes of the disperse dye itself by volatilization of the ink solution, and the kinds and concentration changes of other components dissolved in the ink solution. This foreign matter is a factor generating clogging of nozzles, and deteriorating the clogging recoverability.

On the other hand, if using only disperse dye relatively difficult to be dissolved in the ink solution to avoid such a problem, the kinds of dyes are limited, and thus a problem that hues capable of being represented by using a disperse dye are limited occurs.

The ink composition of the invention suppresses the generation of foreign matter due to the influence of changes of state in the ink solution by including plural kinds of dyes having different dye solubility. Therefore, the ink composition of the invention is an ink composition having excellent discharging stability and clogging recoverability, by which a desired hue can be obtained relatively without limitation to the kind of a coloring material.

Dye A

The dye A is a disperse dye which has a molecular weight of 380 or less and an anthraquinone skeleton having a water-soluble group in a molecule. Examples of the water-soluble group, which are not particularly limited, include at least one kind selected from a group consisting of an amino group, a hydroxyl group, and a carboxyl group. Among these, at least one kind selected from a group consisting of an amino group and a hydroxyl group is preferable. The dye A relatively easily dissolves in the ink solution due to having an anthraquinone skeleton having a water-soluble group in the molecule. However, by using in combination with a dye B described below, even in a case of using the dye A, an ink composition having excellent discharging stability and clogging recoverability is obtained.

The molecular weight of the dye A is 380 or less, and preferably 350 or less. In addition, the lower limit of the molecular weight of the dye A is not particularly limited, and the molecular weight is preferably 270 or greater. When the molecular weight of the dye A is 380 or less, the dye A has excellent sublimability, and thus, there is a tendency that the coloring properties of the obtained recorded matter are more excellent.

Specific examples of the dye A, which are not particularly limited, include Disperse Red 60 and 191, Disperse Blue 26, 35, 56, 72, 77, 91, and 359, and Disperse Violet 28.

The content of the dye A, which is not particularly limited, is preferably 3.0% by mass to 10% by mass, and more preferably 5.0% by mass to 8.0% by mass with respect to the total amount of the ink jet ink composition for sublimation transfer. When the content of the dye A is in the above-described range, there is a tendency that the coloring properties of the obtained recorded matter are more excellent. In addition, the dye A is preferably used as substantially one kind, however, if the content is an amount which is inevitably mixed in (for example, less than 0.1% by mass), plural kinds of dyes may be used.

Dye B

The dye B is a disperse dye which has a molecular weight of 400 or greater. Such a disperse dye has a tendency that sublimability by heating is poor, and the dye A easily contributes to the color of the recorded matter in a case where sublimation transfer is performed using the ink jet ink composition for sublimation transfer.

Examples of such a disperse dye include a disperse dye having an anthraquinone skeleton which may have a substituent, and a disperse dye having an azo skeleton which may have a substituent. Among these, a disperse dye having an anthraquinone skeleton which may have a substituent is preferable. When the dye B is a disperse dye having an anthraquinone skeleton, there is a tendency that wettability of the ink composition with respect to a recording apparatus such as the nozzle inner wall is further improved, and discharging stability is further improved. Examples of the substituent, which are not particularly limited, include a halogen group, a hydroxyl group, an amino group, a nitro group, and a carboxyl group.

The molecular weight of the dye B is 400 or greater, and preferably 500 or greater. In addition, the upper limit of the molecular weight of the dye B is not particularly limited, and the molecular weight thereof is preferably 550 or less.

Specific examples of the dye B, which are not particularly limited, include Solvent Blue 97 and 104, Disperse Violet 26, Disperse Yellow 114 and 163, Disperse Red 92, and Disperse Blue 165 and 354.

Moreover, the dye B may be used alone or two or more kinds may be used in combination.

In addition, the content of the dye B, which is not particularly limited, is preferably 3% by mass to 50% by mass, and more preferably 5% by mass to 20% by mass with respect to the content of the dye A. When the content of the dye B is in the above-described range, there is a tendency that the generation of foreign matter is suppressed, and the dye A easily contributes to the color of the recorded matter in a case where sublimation transfer is performed using the ink jet ink composition for sublimation transfer.

Dye Solubility

In the ink jet ink composition for sublimation transfer, the dye solubility of the dye A is greater than the dye solubility of the dye B. When using in combination with the dye B which has smaller dye solubility than the dye solubility of the dye A, the generation of foreign matter derived from the dye A can be suppressed, and the discharging stability and the clogging recoverability are excellent. In a case where the ink composition includes plural kinds of the dye B, the dye solubility of the dye A is greater than the total of the dye solubilities of all the dyes B from the same viewpoint as the above-described. Moreover, the dye solubilities of the dyes A and B can be measured by the method described in the example.

The dye solubility of the dye B, which is not particularly limited, is preferably $10^{-3}$ or less, more preferably $10^{-4}$ or less, and even more preferably $10^{-5}$ or less. In addition, the lower limit of the dye solubility of the dye B is not particularly limited. When the dye solubility of the dye B is $10^{-3}$ or less, there is a tendency that the generation of foreign matter derived from the dye A can be suppressed, and the discharging stability and the clogging recoverability are excellent.

Water

The ink jet ink composition for sublimation transfer may include water. As the water, which is not particularly limited, for example, pure water such as ion exchange water, ultrafiltration water, reverse osmosis water, and distilled water, or ultrapure water are preferably used. In particular, there is a tendency that when the water is sterilized by irradiating with ultraviolet rays or adding hydrogen peroxide, the generation of fungi or bacteria is further prevented over a long period of time.

When the ink jet ink composition for sublimation transfer includes water, it is possible to suitably adjust the viscosity and the surface tension of the ink for sublimation transfer so as to be included in a preferable range, and it is possible to make the discharging properties be excellent by the ink jet method of the ink for sublimation transfer. In addition, since water is a component that can be easily removed after discharge by the ink jet method, water is also important to increase the productivity of dyed products. In addition, since water is a substance that has extremely high safety with respect to the human body, it is also important to secure the safety of workers in the manufacture of dyed products.

The content of water is preferably 50% by mass to 90% by mass, and more preferably 60% by mass to 80% by mass with respect to the total amount of the ink jet ink composition for sublimation transfer.

Dispersant

The ink jet ink composition for sublimation transfer can include a dispersant. When the ink jet ink composition for sublimation transfer includes a dispersant, there is a tendency that the dispersion stability of the dye in the ink jet ink composition for sublimation transfer is more excellent, and the storage stability of the ink jet ink composition for sublimation transfer and the discharging stability of the ink for sublimation transfer over a long period of time are more excellent. Examples of the dispersant, which are not particularly limited, include an anionic dispersant, a nonionic dispersant, and a polymer dispersant.

Examples of the anionic dispersant, which are not particularly limited, include a salt of aromatic sulfonic acid (for example, a sodium salt, the same shall apply hereinafter), a salt of formalin condensate and β-naphthalene sulfonic acid, a salt of formalin condensate, and alkyl naphthalene sulfonic acid, a salt of formalin condensate and creosote oil sulfonic acid, or a formalin condensate.

Examples of the salt of aromatic sulfonic acid, which are not particularly limited, include creosote oil sulfonic acid, cresol sulfonic acid, phenol sulfonic acid, β-naphthol sulfonic acid, alkyl naphthalene sulfonic acids such as methyl naphthalene sulfonic acid and butyl naphthalene sulfonic acid, a mixture of β-naphthalene sulfonic acid and β-naphthol sulfonic acid, a mixture of cresol sulfonic acid and 2-naphthol-6-sulfonic acid, and lignin sulfonic acid.

Examples of the nonionic dispersant, which are not particularly limited, include an ethylene oxide adduct of phytosterol and an ethylene oxide adduct of cholestanol.

Examples of the polymer dispersant, which are not particularly limited, include polyacrylic acid partial alkyl ester, polyalkylene polyamine, polyacrylate, a styrene-acrylic acid copolymer, and a vinyl naphthalene-maleic acid copolymer.

Moreover, the dispersant may be used alone or two or more kinds may be used in combination.

The content of the dispersant is preferably 1% by mass to 200% by mass, and more preferably 50% by mass to 150% by mass with respect to the total amount of the dye included in the ink jet ink composition for sublimation transfer. When the content of the dispersant is in the above-described range, there is a tendency that the dispersion stability of the dye is further improved.

Water-Soluble Organic Solvent

The ink jet ink composition for sublimation transfer may further include a water-soluble organic solvent. When the ink jet ink composition for sublimation transfer includes the water-soluble organic solvent, there is a tendency that water evaporation from a head due to leaving to stand over a long period of time is effectively suppressed and wettability to an intermediate recording medium is increased, and thus permeability of the ink jet ink composition for sublimation transfer is further improved, and the discharging stability and the clogging recoverability are also further improved. As such a water-soluble organic solvent, compounds which are used in usual inks as a water-soluble organic solvent can be used, and examples thereof include a polyol compound, glycol ether, sugars, and a betaine compound.

Examples of the polyol compound (preferably diol compound) include a polyol compound which has 2 to 6 carbon atoms in a molecule thereof and may have one ether bond in a molecule thereof. Specific examples thereof include glycerin, ethylene glycol, diethylene glycol, triethylene glycol, propylene glycol, dipropylene glycol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 2-methyl-2,4-pentanediol, 3-methyl-1,5-pentanediol, 1,2-hexanediol, and 1,6-hexanediol.

Examples of the glycol ether include monoalkyl ethers of glycol selected from ethylene glycol, diethylene glycol, triethylene glycol, propylene glycol, dipropylene glycol, and tripropylene glycol. More specifically, triethylene glycol monomethyl ether, triethylene glycol monobutyl ether, and dipropylene glycol monopropyl ether can be preferably exemplified.

The saccharides refer to monosaccharides, disaccharides, oligosaccharides (including trisaccharides and tetrasaccharides), and polysaccharides. Examples of the saccharides include homoglycans such as threose, erythrulose, erythrose, arabinose, ribulose, ribose, xylose, xylulose, lyxose, glucose, fructose, mannose, idose, sorbose, gulose, talose, tagatose, galactose, allose, psicose, altrose, maltose, isomaltose, cellobiose, lactose, sucrose, trehalose, isotrehalose, gentiobiose, melibiose, turanose, sophorose, isosaccharose, glucan, fructan, mannan, xylan, galacturonan, mannuronan, N-acetyl glucosamine polymer, heteroglycans such as diheteroglycan and triheteroglycan, and maltotriose, isomaltotriose, panose, maltotetraose, and maltopentaose, and trehalose can be preferably exemplified.

The betaine compound is a compound (inner molecular salt) which has a positive charge and a negative charge at positions which are not adjacent to each other in the same molecule and does not have a charge as the whole molecule, in which a hydrogen atom which can be dissociated is not bonded to an atom having a positive charge. A preferable betaine compound is an N-alkyl substituent of amino acid, and a more preferable betaine compound is an N-trialkyl substituent of amino acid. Examples of the betaine compound include trimethylglycine (also referred to as "glycine betaine"), γ-butyrobetaine, homarin, trigonelline, carnitine, homoserine betaine, valine betaine, lysine betaine, ornithine betaine, alanine betaine, stachydrine, and glutamic acid betaine, and trimethylglycine can be preferably exemplified.

The content of the water-soluble organic solvent is preferably 1% by mass to 40% by mass, and more preferably 5% by mass to 30% by mass with respect to the total amount of the ink jet ink composition for sublimation transfer. When the content of the water-soluble organic solvent is in the above-described range, there is a tendency that water evaporation from a head due to leaving to stand over a long period of time is effectively suppressed and wettability to an intermediate transfer medium is increased, and thus permeability of the ink jet ink composition for sublimation transfer is more excellent, and the discharging stability and the clogging recoverability are also further improved.

Other Additives

As necessary, the ink jet ink composition for sublimation transfer may also further include an antifungal agent, a preservative, an antioxidant, an ultraviolet absorbent, a chelating agent, an oxygen absorber, a pH adjusting agent (for example, triethanolamine, adipic acid, or potassium hydroxide), a solubilizer, or other various additives used in usual inks. Moreover, the various additives may be used alone or two or more kinds may be used in combination.

Examples of an antiseptic mildew-proofing agent include an organic sulfur-based compound, an organic nitrogen sulfur-based compound, an organic halogen-based compound, a haloallyl sulfone-based compound, an iodopropargyl-based compound, an N-haloalkylthio-based compound, a benzothiazole-based compound, a nitrile-based compound, a pyridine-based compound, an 8-oxyquinoline-based compound, an isothiazoline-based compound, a dithiol-based compound, a pyridine oxide-based compound, a nitropropane-based compound, an organotin-based compound, a phenol-based compound, a quaternary ammonium salt-based compound, a triazine-based compound, a thiadiazine-based compound, an anilide-based compound, an adamantane-based compound, a dithiocarbamate-based compound, a brominated indanone-based compound, a benzyl bromoacetate-based compound, and an inorganic salt-based compound. Examples of the organic halogen-based compound include sodium pentachlorophenolate, examples of the pyridine oxide-based compound include sodium pyridinethione-1-oxide, zinc pyridinethione-1-oxide, and examples of the isothiazoline-based compound include amine salt of 1-benzisothiazolin-3-one, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Examples of other antiseptic mildew-proofing agents include sodium dehydroacetate, sodium sorbate, and sodium benzoate.

When the ink jet ink composition for sublimation transfer includes a pH adjusting agent, it is possible to make the storage stability of the ink jet ink composition for sublimation transfer be particularly excellent. In addition, it is possible to make the reliability of dyed products manufactured by using the ink jet ink composition for sublimation transfer be particularly excellent.

As the pH adjusting agent, for example, a pH adjusting agent capable of controlling pH of the ink jet ink composition for sublimation transfer to be in a range of 6.0 to 11.0 can be suitably used. Examples of the pH adjusting agent include alkanolamines such as diethanolamine, triethanolamine, dimethylethanolamine, and diethylethanolamine; hydroxides of alkali metals such as lithium hydroxide, sodium hydroxide, and potassium hydroxide; ammonium hydroxide; carbonates of alkali metals such as lithium carbonate, sodium carbonate, and potassium carbonate; and aminosulfonic acids such as taurine.

Examples of the chelating reagent include disodium ethylenediamine tetraacetate, sodium nitrilotriacetate, sodium hydroxyethyl ethylenediamine triacetate, sodium diethylene triamine pentaacetate, and sodium uracil diacetate.

Examples of the anticorrosive agent include acidic sulfite, sodium thiosulfate, ammonium thioglycolate, diisopropyl ammonium nitrite, pentaerythritol tetranitrate, dicyclohexyl ammonium nitrite, and a benzotriazole-based compound.

Examples of the ultraviolet absorber include a benzophenone-based compound, a cinnamic acid-based compound, a triazine-based compound, a stilbene-based compound, and a so-called fluorescent brightening agent (compound emitting fluorescence by absorbing ultraviolet rays represented by a benzoxazole-based compound).

Examples of an anti-foaming agent include a highly oxidized oil-based compound, a glycerin fatty acid ester-based compound, a fluorine-based compound, a silicone-based compound, and an acetylene-based compound.

As the surface tension adjuster, a surfactant can be exemplified, and examples thereof include anionic surfactants, ampholytic surfactants, cationic surfactants, and non-ionic surfactants.

Examples of the anionic surfactant include alkyl sulfocarboxylate, α-olefin sulfonate, polyoxyethylene alkyl ether acetate, N-acylamino acid and salt thereof, N-acyl methyl taurine salt, alkyl sulfate polyoxy alkyl ether sulfate, alkyl sulfate polyoxyethylene alkyl ether phosphate, rosin acid soap, sulfate esters of castor oil, lauryl alcohol sulfate ester, alkyl phenol type phosphate ester, alkyl-type phosphate ester, alkyl aryl sulfonate, diethyl sulfosuccinate, diethyl hexyl sulfosuccinate, and dioctyl sulfosuccinate.

Examples of the amphoteric surfactant include lauryl dimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, and other imidazoline derivatives thereof.

Examples of the cationic surfactant include 2-vinylpyridine derivatives and poly 4-vinylpyridine derivatives.

Examples of the nonionic surfactant include ether-based surfactants such as polyoxyethylene nonylphenyl ether, polyoxyethylene octyl phenyl ether, polyoxyethylene dodecyl phenyl ether, polyoxyethylene oleyl ether, polyoxyethylene lauryl ether, and polyoxyethylene alkyl ether; ester-based surfactants such as polyoxyethylene oleic acid ester, polyoxyethylene distearate, sorbitan laurate, sorbitan monostearate, sorbitan monooleate, sorbitan sesquioleate, polyoxyethylene monooleate, and polyoxyethylene stearate; and acetylene glycol (alcohol)-based surfactants such as 2,4,7,9-tetramethyl-5-decyne-4,7-diol, 3,6-dimethyl-4-octyne-3,6-diol, and 3,5-dimethyl-1-hexyne-3-ol.

When the ink jet ink composition for sublimation transfer includes a polysiloxane-based compound, it is possible to improve the discharging responsiveness of liquid droplet discharge by the ink jet method. Examples of the polysiloxane-based compound include polyether-modified siloxane and polyether-modified polydimethylsiloxane.

Method of Manufacturing Dyed Product

The method of manufacturing dyed products of the embodiment has an attaching step of attaching the above-described ink jet ink composition for sublimation transfer on an intermediate transfer medium using the ink jet method, and a transferring step of transferring the disperse dye included in the ink jet ink composition for sublimation transfer to the recording medium by heating in a state in which a surface of the intermediate transfer medium on which the ink jet ink composition for sublimation transfer is attached and a dye surface of the recording medium face each other.

Attaching Step

The attaching step is a step of attaching the above-described ink jet ink composition for sublimation transfer on an intermediate transfer medium using the ink jet method. Discharge of the ink jet ink composition for sublimation transfer by the ink jet method can be performed using a known ink jet recording apparatus. As the discharging method, a piezo method or a method of discharging ink by bubbles generated by heating the ink can be used. Among these, the piezo method is preferable from the viewpoint of the change in quality of the ink jet ink composition for sublimation transfer being difficult.

In the attaching step, ink compositions other than the ink jet ink composition for sublimation transfer of the embodiment may be used. Thus, for example, it is possible to further widen a color gamut capable of being expressed.

Intermediate Transfer Medium

As the intermediate transfer medium, which is not particularly limited, for example, paper such as plain paper or a recording medium provided with an ink absorbing layer (which is referred to as paper for exclusive use for ink jet or coated paper) can be used. Among these, paper provided with an ink absorbing layer which is formed of inorganic fine particles such as silica is preferable. In the process of drying the ink jet ink composition for sublimation transfer attached to the intermediate transfer medium, it is possible to obtain the intermediate transfer medium in which bleeding is suppressed, and in the following transferring step, there is a tendency that the sublimation of the disperse dye proceeds more smoothly.

Transferring Step

The transferring step is a step of transferring the disperse dye included in the ink jet ink composition for sublimation transfer to a recording medium by heating in a state in which a surface of the intermediate transfer medium on which the ink jet ink composition for sublimation transfer is attached and a dye surface of the recording medium face each other.

The heating temperature in the transferring step, which is not particularly limited, is preferably 160° C. to 220° C., and more preferably 170° C. to 200° C. When the heating temperature is in the above-described range, there is a tendency that the energy required for transferring can be smaller and the productivity of the recorded matter is more excellent. In addition, there is a tendency that the coloring properties of the obtained recorded matter are more excellent.

The heating time in the step, which also depends on the heating temperature, is 30 seconds to 90 seconds, and more preferably 45 seconds to 60 seconds. When the heating time is in the above-described range, there is a tendency that the energy required for transferring can be smaller and the productivity of the recorded matter is more excellent. In addition, there is a tendency that the coloring properties of the obtained recorded matter are more excellent.

In addition, the step can be performed by heating in a state in which a surface of the intermediate transfer medium on which the ink jet ink composition for sublimation transfer is tightly attached faces the recording medium with a constant distance therebetween, or by heating in a state in which the intermediate transfer medium and the recording medium are attached. Among these, the step is preferably performed by heating in a state in which the intermediate transfer medium and the recording medium are tightly attached. Thus, there is a tendency that the energy required for transferring can be smaller and the productivity of the recorded matter is more excellent. In addition, since the positional deviation between the recording medium and the intermediate transfer medium in the step is less likely to occur, there is a tendency that a recorded matter in which a dye is accurately transferred at the desired position can be obtained, and the coloring properties of the obtained recorded matter are further improved.

Recording Medium

Examples of the recording medium, which are not particularly limited, include fabric (hydrophobic fiber fabric or the like), resin (plastic) films, paper, glass, metals, and ceramics. In addition, as the recording medium, a medium having a three dimensional shape such as a sheet shape, a spherical shape, or a rectangular parallelepiped shape may be used.

In a case where the recording medium is fabric, examples of fibers constituting the fabric, which are not particularly limited, include polyester fibers, nylon fibers, triacetate fibers, diacetate fibers, polyamide fibers, and blended products using two or more kinds of these fibers. In addition, blended products of these and regenerated fibers such as rayon or natural fibers such as cotton, silk, and wool may be used.

In addition, in a case where the recording medium is a resin (plastic) film, examples of the resin (plastic) film used, which are not particularly limited, include a polyester film, a polyurethane film, a polycarbonate film, a polyphenylene sulfide film, a polyimide film, and a polyamideimide film. The resin (plastic) film may be a laminate in which plural layers are laminated, and may be constituted by a gradient material of which the composition changes with a gradient.

Other Steps

In addition to the steps as described above, the method of manufacturing dyed products of the embodiment may further have other steps (pretreatment step, intermediate treatment step, and post-treatment step).

Examples of the pretreatment step, which are not particularly limited, include a step of coating a coating layer on a recording medium.

Examples of the intermediate treatment step, which are not particularly limited, include a step of preheating a recording medium before the intermediate treatment step or the transferring step.

Examples of the post-treatment step, which are not particularly limited, include a step of cleaning a recording medium.

In addition, the ink jet ink composition for sublimation transfer of the embodiment can be suitably used in a sublimation transfer in which an intermediate transfer medium is not used. Examples of the sublimation transfer in which an intermediate transfer medium is not used, which are not particularly limited, include a method having a step of attaching the ink jet ink composition for sublimation transfer of the embodiment by the ink jet method to an ink absorbing layer of a recording medium (film product or the like) provided with a peelable ink absorbing layer, a step of heating the recording medium provided with the ink absorbing layer to which the ink jet ink composition for sublimation transfer is attached and sublimation-diffusion-dyeing the recording medium on the lower layer side, and a step of obtaining a recorded matter by peeling the ink absorbing layer from the recording medium.

Ink Set

The ink set of the embodiment includes a first ink composition and a second ink composition, in which the first ink composition is the above-described ink jet ink composition for sublimation transfer, the second ink composition is an ink jet black ink composition for sublimation transfer including at least one kind selected from a group consisting of the dye A, the dye B, and the dye C, the dye C is a disperse dye which has a molecular weight of 380 or less and does not have an anthraquinone skeleton having a water-soluble group in the molecule, in the second ink composition, the dye solubility of the dye A is greater than the dye solubility of the dye C, and the dye solubility of the dye C is $10^{-3}$ or less.

By using the ink set of the embodiment, when expressing a black color by color-mixing each of ink compositions on an intermediate recording medium, it is possible to prevent distortion of color due to the difference in the transfer temperature which a coloring material (dye) has. Here, "distortion of color" means that the hue of a recorded matter turns reddish or bluish with respect to the black color desired to be expressed, and through this phenomenon, there is a tendency that a chroma C* described below becomes higher.

First Ink Composition

The first ink composition is the above-described ink jet ink composition for sublimation transfer. Moreover, the ink set of the embodiment may be provided with one kind of the first ink composition, or equipped with a plurality of two or more kinds of the first ink composition.

Second Ink Composition

The second ink composition is an ink jet black ink composition for sublimation transfer including at least one kind selected from a group consisting of the dye A, the dye B, and the dye C. The kinds and the content of the dyes A and B may be the same as those in the above-described ink jet ink composition for sublimation transfer (the first ink composition).

Dye C

The dye C is a disperse dye which has a molecular weight of 380 or less and does not have an anthraquinone skeleton having a water-soluble group. By using such a disperse dye, there is a tendency that the generation of foreign matter derived from the dye C due to the influence of changes of state in the ink solution can be suppressed, and the coloring properties of a black color in the obtained recorded matter are more excellent. Examples of the dye C, which are not particularly limited, include a disperse dye having an anthraquinone skeleton which does not have a water-soluble group in the molecule, and a disperse dye having an azo skeleton which may have a substituent. Among these, the disperse dye having an anthraquinone skeleton which does not have a water-soluble group in the molecule is preferable. When the dye C is a disperse dye having an anthraquinone skeleton which does not have a water-soluble group, there is a tendency that wettability of the ink composition with respect to a recording apparatus such as the nozzle inner wall is further improved, and discharging stability is further improved.

The molecular weight of the dye C is 380 or less, and preferably 350 or less. In addition, the lower limit of the molecular weight of the dye C is not particularly limited, and the molecular weight is preferably 270 or greater. When the molecular weight of the dye C is 380 or less, the dye C has excellent sublimability. That is, by contribution of the dyes A and C to the color of the recorded matter in a case where sublimation transfer is performed using the ink jet black ink composition for sublimation transfer including the dye C, there is a tendency that the coloring properties of a black color in the obtained recorded matter are more excellent.

Specific examples of the dye C, which are not particularly limited, include disperse dyes listed below.

Examples of a yellow disperse dye, which are not particularly limited, include C.I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 116, 118, 119, 122, 124, 126, 135, 140, 141, 149, 160, 162, 164, 165, 179, 180, 182, 183, 184, 186, 192, 198, 199, 202, 204, 210, 211, 215, 216, 218, 224, 227, 231, and 232.

Examples of an orange disperse dye, which are not particularly limited, include C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142.

Examples of a red disperse dye, which are not particularly limited, include C.I. Disperse Red 1, 4, 5, 7, 11, 12, 13, 15, 17, 27, 43, 44, 50, 52, 53, 54, 55, 56, 58, 59, 65, 72, 73, 74, 75, 76, 78, 81, 82, 86, 88, 90, 91, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, and 328.

Examples of a violet disperse dye, which are not particularly limited, include C.I. Disperse Violet 1, 4, 8, 23, 27, 31, 33, 35, 36, 38, 40, 43, 46, 48, 50, 51, 52, 56, 57, 59, 61, 63, 69, and 77.

Examples of a green disperse dye, which are not particularly limited, include C.I. Disperse Green 9.

Examples of a brown disperse dye, which are not particularly limited, include C.I. Disperse Brown Green 1, 2, 4, 9, 13, and 19.

Examples of a blue disperse dye, which are not particularly limited, include C.I. Disperse Blue 3, 7, 9, 14, 16, 19, 20, 27, 43, 44, 54, 55, 58, 60, 62, 64, 71, 73, 75, 79, 81, 82, 83, 87, 93, 94, 95, 96, 102, 106, 108, 112, 113, 115, 118, 120, 122, 125, 128, 130, 139, 141, 142, 143, 146, 148, 149, 153, 154, 158, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, and 333.

Examples of a black disperse dye, which are not particularly limited, include C.I. Disperse Black 1, 3, 10, and 24.

Moreover, the dye C may be used alone or two or more kinds may be used in combination.

The content of the dye C is not particularly limited with respect to the total amount of the second ink composition, and is preferably 3% by mass to 50% by mass, and more preferably 5% by mass to 20% by mass with respect to the content of the dye A. When the content of the dye C is in the above-described range, there is a tendency that the coloring properties of the obtained recorded matter are more excellent.

In the second ink composition, the dye solubility of the dye A is greater than the dye solubility of the dye C. When using in combination with the dye C which has smaller dye solubility than the dye solubility of the dye A, there is a tendency that the generation of foreign matter derived from the dye A can be suppressed, and the discharging stability and the clogging recoverability are further excellent. In a case where the ink composition includes plural kinds of the dyes B and C, the dye solubility of the dye A is greater than the total of the dye solubilities of all the dyes B and C from the same viewpoint as the above-described. Moreover, the dye solubilities of the dye C can be measured by the method described in the example.

The dye solubility of the dye C, which is not particularly limited, is preferably $10^{-3}$ or less, more preferably $10^{-4}$ or less, and even more preferably $10^{-5}$ or less. In addition, the lower limit of the dye solubility of the dye C is not particularly limited. When the dye solubility of the dye C is $10^{-3}$ or less, there is a tendency that the generation of foreign matter derived from the dye A can be suppressed, and the discharging stability and the clogging recoverability are further improved.

Moreover, other components which can be included in the ink jet black ink composition for sublimation transfer and the content thereof, which are not particularly limited, may be the same as those described in the ink jet ink composition for sublimation transfer (the first ink composition).

In the recorded matter after sublimation transfer is performed using the ink jet black ink composition for sublimation transfer, the chroma C* of the transfer portion in a LAB colorimetric system is preferably 10 or less, and more preferably 6 or less. The lower limit of the chroma C*, which is not particularly limited, is preferably as low as possible, and more preferably 0. When the chroma C* is 10 or less, there is a tendency that the transfer portion becomes black. The chroma C* can be controlled by suitably changing the kinds and the mixing ratio of the disperse dyes. Here, as a measurement sample used in the method of measuring the chroma C*, recorded matter obtained by performing the transferring step at 200° C. for 60 seconds on a white recording medium is used. Moreover, "white color" in the specification means that L* is 70 or greater, and both a* value and b* value are in the range of −10 to 10. [The chroma C* is determined by $C^* = [(a^*)^2 + (b^*)^2]^{1/2}$. a*, b*, and L* represent sensible chromaticity indexes defined in CIELAB color space.]

EXAMPLES

Hereinafter, the invention will be more specifically described using Examples and Comparative Examples. The invention is not limited to these Examples.
1. Material for Ink Composition
The main materials for the ink composition used in the following Examples and Comparative examples are as follows.
Coloring Material
Dye A
DR60 (Disperse Red 60, which has an anthraquinone skeleton having an amino group and a hydroxyl group)
DR191 (Disperse Red 191, which has an anthraquinone skeleton having an amino group and a hydroxyl group)
DB359 (Disperse Blue 359, which has an anthraquinone skeleton having an amino group)
DB72 (Disperse Blue 72, which has an anthraquinone skeleton having a hydroxyl group)
Dye B
DY163 (Disperse Yellow 163, which has an azo skeleton)
SB97 (Disperse Blue 97, which has an anthraquinone skeleton not having a water-soluble group)
DB165 (Disperse Blue 165, which has an azo skeleton)
Dye C
DB54 (Disperse Yellow 54, which has a quinolyl skeleton)
DO25 (Disperse Orange 25, which has an azo skeleton)
DB14 (Disperse Blue 14, which has an anthraquinone skeleton not having a water-soluble group)
DB360 (Disperse Blue 360, which has an azo skeleton)
Surfactant
BYK-348 (silicone-based surfactant, manufactured by BYK Japan KK)
Dispersant
NS (formalin condensate of β-naphthalene sulfonic acid (anionic dispersant))
Water-soluble Organic Solvent
Glycerin
Propylene glycol
Preparation of Ink Composition
Each material was mixed in according to the composition (% by mass) shown in Table 1, whereby each ink composition was obtained.
Method of Measuring Dye Solubility
A solubility measurement solution was prepared with exactly the same composition as in the ink composition except that a dye was not added. While maintaining the temperature of the solubility measurement solution at 25° C., 0.1% of dye powders of the dyes A, B, and C was added thereto, and the mixture was stirred for 5 hours. After stirring ended, all of the undissolved dye was precipitated by a centrifugal separator, and the dissolved portion of the supernatant was collected by separation. The concentration of dye present in the supernatant portion in which the dye had dissolved was quantified by HPLC. The solubility was the amount of solute (g) per 100 g of solution as commonly used.

TABLE 1

| | | Dye | | | | | | | |
|---|---|---|---|---|---|---|---|---|---|
| | | DR60 | DR191 | DB359 | DB72 | DY163 | SB97 | DB165 | DY54 |
| | | | | | Base skeleton | | | | |
| | | Anthraquinone skeleton having water-soluble group | Anthraquinone skeleton having water-soluble group | Anthraquinone skeleton having water-soluble group | Anthraquinone skeleton having water-soluble group | Azo skeleton | Anthraquinone skeleton not having water-soluble group | Azo skeleton | Quinolyl skeleton |
| | | | | | Molecular weight | | | | |
| | | 331 | 375 | 291 | 329 | 417 | 531 | 45 | 289 |
| | | | | | Kind of dye | | | | |
| Dye solubility | | Dye A $1.5 \times 10^{-3}$ | Dye A $1.5 \times 10^{-3}$ | Dye A $1.5 \times 10^{-3}$ | Dye A $1.5 \times 10^{-3}$ | Dye B $1.0 \times 10^{-5}$ | Dye B $1.0 \times 10^{-5}$ | Dye B $1.0 \times 10^{-5}$ | Dye C $1.0 \times 10^{-5}$ |
| First ink magenta | M-1 | — | 6.0 | — | — | — | — | 1.2 | — |
| | M-2 | 6.0 | — | — | — | — | — | 1.2 | — |
| | M-3 | — | 6.0 | — | — | — | 1.2 | — | — |
| | M-4 | — | — | — | — | — | 1.2 | — | — |
| | M-5 | — | — | — | — | — | 0.3 | — | — |
| | M-6 | — | — | — | — | — | 1.8 | — | — |
| | M-7 | — | 6.0 | — | — | — | — | — | — |
| | M-8 | 6.0 | — | — | — | — | — | — | — |
| | M-9 | 6.0 | 1.2 | — | — | — | — | — | — |
| | M-10 | 6.0 | — | 1.2 | — | — | — | — | — |
| | M-11 | 6.0 | — | — | 1.2 | — | — | — | — |
| | M-12 | — | 6.0 | 1.2 | — | — | — | — | — |
| | M-13 | — | 6.0 | — | 1.2 | — | — | — | — |

TABLE 1-continued

|   |   | 1 | 2 | 3 | 4 | 5 | 6 | 7 | 8 |
|---|---|---|---|---|---|---|---|---|---|
|   | M-14 | 6.0 | — | — | — | — | — | — | — |
|   | M-15 | — | 6.0 | — | — | — | — | — | — |
|   | M-16 | — | 6.0 | — | — | — | — | — | — |
|   | M-17 | — | 6.0 | — | — | — | — | — | 1.2 |
| First ink cyan | C-1 | — | — | — | 4.0 | — | — | 0.8 | — |
|   | C-2 | — | — | 4.0 | — | — | — | 0.8 | — |
|   | C-3 | — | — | — | 4.0 | 0.8 | — | — | — |
|   | C-4 | — | — | 4.0 | — | 0.8 | — | — | — |
|   | C-5 | — | — | 4.0 | — | 1.2 | — | — | — |
|   | C-6 | — | — | 4.0 | — | 1.2 | — | — | — |
|   | C-7 | — | — | — | 4.0 | — | — | — | — |
|   | C-8 | — | — | 4.0 | — | — | — | — | — |
|   | C-9 | — | — | 4.0 | 4.0 | — | — | — | — |
|   | C-10 | — | — | 4.0 | — | — | — | — | — |
|   | C-11 | — | — | — | 4.0 | — | — | — | — |
|   | C-12 | — | — | — | 4.0 | — | — | — | 0.8 |
| Second ink black | B-1 | 3.5 | — | — | — | — | — | — | 0.5 |
|   | B-2 | 3.5 | — | — | — | — | — | — | 0.5 |
|   | B-3 | — | — | 3.5 | — | — | — | — | 0.5 |
|   | B-4 | — | — | 3.5 | — | — | — | — | 0.5 |
|   | B-5 | 3.5 | — | — | — | — | — | 2.5 | 0.5 |
|   | B-6 | 2.5 | — | 3.5 | — | — | — | — | 0.5 |
|   | B-7 | — | — | — | — | 0.5 | 3.5 | — | — |

| | | Dye | | | Surfactant | | Water-soluble organic solvent | | |
|---|---|---|---|---|---|---|---|---|---|
| | | DO25 | DB14 | DB360 | | | | | |
| | | Base skeleton | | | | | | | |
| | | Azo skeleton | Anthraquinone skeleton not having water-soluble group | Azo skeleton | | | | | |
| | | Molecular weight | | | | | | | |
| | | 323 | 266 | 319 | | | | | |
| | | Kind of dye | | | | | | | |
| | Dye solubility | Dye C $1.0 \times 10^{-5}$ | Dye C $1.0 \times 10^{-5}$ | Dye C $1.0 \times 10^{-5}$ | BYK-348 | Dispersant NS | Glycerin | Propylene glycol | Water |
| First ink magenta | M-1 | — | — | — | 0.8 | 7.2 | 15.0 | 5.0 | 64.8 |
| | M-2 | — | — | — | 0.8 | 7.2 | 15.0 | 5.0 | 64.8 |
| | M-3 | — | — | — | 0.8 | 7.2 | 15.0 | 5.0 | 64.8 |
| | M-4 | — | — | — | 0.8 | 7.2 | 15.0 | 5.0 | 64.8 |
| | M-5 | — | — | — | 0.8 | 6.3 | 15.0 | 5.0 | 66.6 |
| | M-6 | — | — | — | 0.8 | 7.8 | 15.0 | 5.0 | 63.6 |
| | M-7 | — | — | — | 0.8 | 6.0 | 15.0 | 5.0 | 67.2 |
| | M-8 | — | — | — | 0.8 | 6.0 | 15.0 | 5.0 | 67.2 |
| | M-9 | — | — | — | 0.8 | 7.2 | 15.0 | 5.0 | 64.8 |
| | M-10 | — | — | — | 0.8 | 7.2 | 15.0 | 5.0 | 64.8 |
| | M-11 | — | — | — | 0.8 | 7.2 | 15.0 | 5.0 | 64.8 |
| | M-12 | — | — | — | 0.8 | 7.2 | 15.0 | 5.0 | 64.8 |
| | M-13 | — | — | — | 0.8 | 7.2 | 15.0 | 5.0 | 64.8 |
| | M-14 | — | — | 1.2 | 0.8 | 7.2 | 15.0 | 5.0 | 64.8 |
| | M-15 | — | — | 1.2 | 0.8 | 7.2 | 15.0 | 5.0 | 64.8 |
| | M-16 | — | 1.2 | — | 0.8 | 7.2 | 15.0 | 5.0 | 64.8 |
| | M-17 | — | — | — | 0.8 | 7.2 | 15.0 | 5.0 | 64.8 |
| First ink cyan | C-1 | — | — | — | 0.8 | 4.8 | 20.0 | 5.0 | 64.6 |
| | C-2 | — | — | — | 0.8 | 4.8 | 20.0 | 5.0 | 64.6 |
| | C-3 | — | — | — | 0.8 | 4.8 | 20.0 | 5.0 | 64.6 |
| | C-4 | — | — | — | 0.8 | 4.8 | 20.0 | 5.0 | 64.6 |
| | C-5 | — | — | — | 0.8 | 4.2 | 20.0 | 5.0 | 65.8 |
| | C-6 | — | — | — | 0.8 | 5.2 | 20.0 | 5.0 | 63.8 |
| | C-7 | — | — | — | 0.8 | 4.0 | 20.0 | 5.0 | 66.2 |
| | C-8 | — | — | — | 0.8 | 4.0 | 20.0 | 5.0 | 66.2 |
| | C-9 | — | — | — | 0.8 | 8.0 | 20.0 | 5.0 | 58.2 |
| | C-10 | 0.8 | — | — | 0.8 | 4.8 | 20.0 | 5.0 | 64.6 |
| | C-11 | 0.8 | — | — | 0.8 | 4.8 | 20.0 | 5.0 | 64.6 |
| | C-12 | — | — | — | 0.8 | 4.8 | 20.0 | 5.0 | 64.6 |
| Second ink black | B-1 | — | 2.5 | — | 0.8 | 6.5 | 15.0 | 5.0 | 66.2 |
| | B-2 | — | — | 2.5 | 0.8 | 6.5 | 15.0 | 5.0 | 66.2 |
| | B-3 | 2.5 | — | — | 0.8 | 6.5 | 15.0 | 5.0 | 66.2 |
| | B-4 | 2.5 | — | — | 0.8 | 6.5 | 15.0 | 5.0 | 66.2 |
| | B-5 | — | — | — | 0.8 | 6.5 | 15.0 | 5.0 | 66.2 |
| | B-6 | — | — | — | 0.8 | 6.5 | 15.0 | 5.0 | 66.2 |
| | B-7 | 2.5 | — | — | 0.8 | 6.5 | 15.0 | 5.0 | 66.2 |

Evaluation of Ink Jet Ink Composition for Sublimation Transfer

Examples 1 to 12 and Comparative Examples 1 to 17

Manufacture of Dyed Product

Each of the ink compositions obtained above was filled into an ink jet printer (PX-G930, manufactured by Seiko Epson Corp.), respectively. Next, the ink for sublimation transfer was filled into the head of the printer, and it was confirmed that no nozzles were clogged, and normal recording was possible. Using the ink jet printer, each of the inks for sublimation transfers described above was discharged, and a gradation pattern with ten gradations was attached on a TRANSJET Classic (manufactured by Cham Paper Group Switzerland Inc.) which is an intermediate transfer medium in a recording resolution of 1,440 dpi×720 dpi. In addition, the operating environment of the printer was 25° C.

Hue (Hue Angle Defined in CIELAB Color Space)

Then, the side on which the ink for sublimation transfer was tightly attached of the intermediate transfer medium was brought into close contact (100% polyester, Amina, manufactured by Toray Industries, Inc.) with a fabric which is a white recording medium, in this state, heating was performed at 200° C. for 60 seconds using a heat press machine (TP-608M, manufactured by Taiyoseiki Co., Ltd.), and sublimation transfer was performed, whereby each recorded matter item was obtained.

For the manufactured dyed product described above, a* and b* defined in CIELAB color space of each gradation portion of a dyed portion on the surface on the side that faced the intermediate transfer medium were measured using a colorimeter (Gretag Macbeth Spectrolino, manufactured by X-Rite Co., Ltd.), the hue angle ∠Ho were determined, respectively, and evaluation was performed according to the following criteria.

[The hue angle ∠H° was determined by $\angle H° = \tan^{-1}(b*/a*) + 180$ (in a case of $a*<0$), or $\angle H° = \tan^{-1}(b*/a*) + 360$ (in a case of $a*>0$)]

Magenta
A: The hue angle ∠H° was −10° to 30°.
B: The hue angle ∠H° was −15° to less than −10°, or greater than 30° to 35°.
C: The hue angle ∠H° was −20° to less than −15°, or greater than 35° to 40°.

Cyan
A: The hue angle ∠H° was 240° to 280°.
B: The hue angle ∠H° was 235° to less than 240°, or greater than 280° to 285°.
C: The hue angle ∠H° was 230° to less than 235°, or greater than 285° to 290°.

Clogging Recoverability after Leaving to Stand in High-Temperature Environment

Each of the ink compositions obtained above was filled into the ink jet printer (PX-G930, manufactured by Seiko Epson Corp.), respectively. Next, the ink for sublimation transfer was filled into the head of the printer, and it was confirmed that no nozzles were clogged, and normal recording was possible. Then, the head was left to stand at a position outside the home position (a state in which the head was deviated from the position of a cap with which the printer was equipped, and thus, the head was not capped with the cap) at 40° C. for 48 hours in an environment of 20 RH %. After being left to stand, the ink composition was discharged again from all the nozzles, the number of times of cleaning required until the printing was equivalent to the initial printing was measured, and the result was determined based on the following criteria.
A: Discharging from all the nozzles was possible when cleaning was performed three or less times.
B: Discharging from all the nozzles was possible when cleaning was performed four to six times.
C: Clogging of all the nozzles was not recovered from even when cleaning was performed seven or more times.

Discharging Stability

The obtained ink compositions were filled into an ink jet printer (SC-F7000, manufactured by Seiko Epson Corp.), respectively. Next, the ink for sublimation transfer was filled into the head of the printer, and it was confirmed that no nozzles were clogged, and normal recording was possible. In addition, the operating environment of the printer was 25° C. Next, a natural image pattern in which a landscape and a figure of a B0+ size were included was formed on a Transjet Sportline (manufactured by Cham Paper Group Switzerland Inc.) having a width of 44 inches which is an intermediate transfer medium, and then, it was confirmed whether nozzle omission was present or not. The recording of the pattern and the nozzle omission were repeatedly checked, and evaluation was performed according to the following evaluation criteria.
A: The number of pattern recording until nozzle omission occurred was 20 or greater pieces.
B: The number of pattern recording until nozzle omission occurred was 10 to less than 20 pieces.
C: The number of pattern recording until nozzle omission occurred was less than 10 pieces.

Evaluation of Ink Jet Black Ink Composition for Sublimation Transfer and Ink Set Examples 13 to 20 and Comparative Examples 18 to 19

Clogging Recoverability after Leaving to Stand in High-Temperature Environment

Each of the ink compositions obtained above was filled into the ink jet printer (PX-G930, manufactured by Seiko Epson Corp.), respectively. Next, the ink for sublimation transfer was filled into the head of the printer, and it was confirmed that no nozzles were clogged, and normal recording was possible. Then, the head was left to stand at a position outside the home position (a state in which the head was deviated from the position of a cap with which the printer was equipped, and thus, the head was not capped with the cap) at 40° C. for 48 hours in an environment of 20 RH %. After being left to stand, the ink composition was discharged again from all the nozzles, the number of times of cleaning required until the printing was equivalent to the initial printing was measured, and the result was determined based on the following criteria.
A: Discharging from all the nozzles was possible when cleaning was performed three or less times.
B: Discharging from all the nozzles was possible when cleaning was performed four to six times.
C: Clogging of all the nozzles was not recovered from even when cleaning was performed seven or greater times.

Discharging Stability

The obtained ink compositions were filled into an ink jet printer (SC-F7000, manufactured by Seiko Epson Corp.), respectively. Next, each of the ink compositions was filled in the head of the printer, and it was confirmed that no nozzles were clogged, and normal recording was possible. In addition, the operating environment of the printer was 25° C. Next, a natural image pattern in which a landscape and a figure of a B0+ size were included was formed on a Transjet Sportline (manufactured by Cham Paper Group Switzerland Inc.) having a width of 44 inches which is an intermediate transfer medium, and then, it was confirmed whether the nozzle omission was present or not. The recording of the pattern and the nozzle omission were repeatedly checked, and evaluation was performed according to the following evaluation criteria.

A: The number of pattern recording until the nozzle omission occurred was 20 or more pieces.
B: The number of pattern recording until the nozzle omission occurred was 10 to less than 20 pieces.
C: The number of pattern recording until the nozzle omission occurred was less than 10 pieces.

Chroma C* when Color-Mixing

Each of a magenta ink composition, a cyan ink composition, and a black ink composition was mounted on the ink jet printer (PX-G930, manufactured by Seiko Epson Corp.). Next, using the printer driver, each of the ink compositions was filled into the head of the printer, and it was confirmed that no nozzles were clogged, and normal recording was possible.

In a case of setting a maximum deposition amount which can be discharged from each nozzle as 100%, each deposition amount of black, magenta, and cyan was adjusted so as to be a black color in which 50% of black, 10% of magenta, and 10% of cyan were mixed, and a solid pattern was attached to a Transjet Sportline (manufactured by Cham Paper Group Switzerland Inc.) which is an intermediate transfer medium in a recording resolution of 1,440 dpi×720 dpi. In addition, the operating environment of the printer was 25° C.

Then, the side on which the ink composition was tightly attached of the intermediate transfer medium was brought into close contact (100% polyester, Amina, manufactured by Toray Industries, Inc.) with a fabric which is a white recording medium, in this state, heating was performed at 200° C. for 60 seconds using a heat press machine (TP-608M, manufactured by Taiyoseiki Co., Ltd.), and sublimation transfer was performed, whereby each recorded matter item was obtained.

The chroma C* of each of the obtained recorded matter items was evaluated. Specifically, for each of the obtained recorded matter items, color measurement of a* value and b* value was performed using a colorimeter (Gretag Macbeth Spectrolino, manufactured by X-Rite Co., Ltd.), C* was calculated, and evaluation was performed according to the following criteria.

A: C* was less than 5.
B: C* was 5 to less than 10.
C: C* was 10 or greater.

TABLE 2

| | Ink name | Hue | Clogging recoverability | Discharging stability |
|---|---|---|---|---|
| Example 1 | M-1 | A | A | B |
| Example 2 | M-2 | A | A | B |
| Example 3 | M-3 | A | A | A |
| Example 4 | M-4 | A | A | A |
| Example 5 | M-5 | A | B | A |
| Example 6 | M-6 | B | A | A |
| Comparative Example 1 | M-7 | A | C | B |
| Comparative Example 2 | M-8 | A | C | B |

TABLE 2-continued

| | Ink name | Hue | Clogging recoverability | Discharging stability |
|---|---|---|---|---|
| Comparative Example 3 | M-9 | A | C | A |
| Comparative Example 4 | M-10 | C | C | A |
| Comparative Example 5 | M-11 | C | C | A |
| Comparative Example 6 | M-12 | C | C | A |
| Comparative Example 7 | M-13 | C | C | A |
| Comparative Example 8 | M-14 | C | A | B |
| Comparative Example 9 | M-15 | C | A | B |
| Comparative Example 10 | M-16 | C | A | A |
| Comparative Example 11 | M-17 | C | A | B |
| Example 7 | C-1 | A | A | B |
| Example 8 | C-2 | A | A | B |
| Example 9 | C-3 | A | A | A |
| Example 10 | C-4 | A | A | A |
| Example 11 | C-5 | A | B | A |
| Example 12 | C-6 | B | A | B |
| Comparative Example 12 | C-7 | A | C | B |
| Comparative Example 13 | C-8 | A | C | B |
| Comparative Example 14 | C-9 | A | C | A |
| Comparative Example 15 | C-10 | C | A | B |
| Comparative Example 16 | C-11 | C | A | B |
| Comparative Example 17 | C-12 | C | A | B |

TABLE 3

| | Ink set | | | Black | | Chroma C* when color-mixing |
|---|---|---|---|---|---|---|
| | Magenta | Cyan | Black | Clogging recoverability | Discharging stability | |
| Example 13 | M-3 | C-3 | B-1 | A | A | A |
| Example 14 | M-3 | C-4 | B-1 | A | A | A |
| Example 15 | M-4 | C-3 | B-1 | A | A | A |
| Example 16 | M-4 | C-4 | B-1 | A | A | A |
| Example 17 | M-4 | C-4 | B-2 | A | B | A |
| Example 18 | M-4 | C-4 | B-3 | A | B | A |
| Example 19 | M-4 | C-4 | B-4 | A | B | A |
| Example 20 | M-4 | C-4 | B-5 | A | B | B |
| Comparative Example 18 | M-4 | C-4 | B-6 | C | A | A |
| Comparative Example 19 | M-4 | C-4 | B-7 | A | B | C |

The entire disclosure of Japanese Patent Application No. 2013-235131, filed Nov. 13, 2013 is expressly incorporated by reference herein.

What is claimed is:

1. An ink jet ink composition for sublimation transfer, comprising:
a dye A; and a dye B, wherein the dye A includes a disperse dye which has a molecular weight of 380 or less and an anthraquinone skeleton having a water-soluble group in a molecule, the dye B includes a disperse dye which has a molecular weight of 400 or greater, and in the ink jet ink composition for sublimation transfer, dye solubility of the dye A is greater than dye solubility of the dye B, and wherein the content of the dye B is 5% by mass or greater and 20% by mass or less with respect to the total amount of the dye A.

2. The ink jet ink composition for sublimation transfer according to claim 1, wherein in the ink jet ink composition for sublimation transfer, the dye solubility of the dye B is 10.sup.−3 or less.

3. A method of manufacturing dyed products, comprising: attaching the ink jet ink composition for sublimation transfer according to claim 2 on an intermediate transfer medium using an ink jet method; and transferring a disperse dye included in the ink jet ink composition for sublimation transfer to a recording medium by heating in a state in which a surface of the intermediate transfer medium on which the ink jet ink composition for sublimation transfer is attached and a dye surface of the recording medium face each other.

4. The method of manufacturing dyed products according to claim 3, wherein a heating temperature in the transferring is 160.degree. C. to 220.degree. C.

5. An ink set, comprising: a first ink composition; and a second ink composition, wherein the first ink composition includes at least one kind of the ink jet ink composition for sublimation transfer according to claim 2, the second ink composition is an ink jet black ink composition for sublimation transfer including at least one kind selected from a group consisting of a dye A which is a disperse dye which has a molecular weight of 380 or less and an anthraquinone skeleton having a water-soluble group in a molecule, a dye B which is a disperse dye which has a molecular weight of 400 or greater, and a dye C, the dye C is a disperse dye which has a molecular weight of 380 or less and does not have the anthraquinone skeleton having the water-soluble group in the molecule, and in the second ink composition, dye solubility of the dye A is greater than dye solubilities of the dyes B and C, and dye solubility of the dye C is $10^{-3}$ or less.

6. The ink jet ink composition for sublimation transfer according to claim 1, wherein the dye B is a disperse dye which has the anthraquinone skeleton in a molecule.

7. A method of manufacturing dyed products, comprising: attaching the ink jet ink composition for sublimation transfer according to claim 6 on an intermediate transfer medium using an ink jet method; and transferring a disperse dye included in the ink jet ink composition for sublimation transfer to a recording medium by heating in a state in which a surface of the intermediate transfer medium on which the ink jet ink composition for sublimation transfer is attached and a dye surface of the recording medium face each other.

8. The method of manufacturing dyed products according to claim 7, wherein a heating temperature in the transferring is 160.degree. C. to 220.degree. C.

9. An ink set, comprising: a first ink composition; and a second ink composition, wherein the first ink composition includes at least one kind of the ink jet ink composition for sublimation transfer according to claim 6, the second ink composition is an ink jet black ink composition for sublimation transfer including at least one kind selected from a group consisting of a dye A which is a disperse dye which has a molecular weight of 380 or less and an anthraquinone skeleton having a water-soluble group in a molecule, a dye B which is a disperse dye which has a molecular weight of 400 or greater, and a dye C, the dye C is a disperse dye which has a molecular weight of 380 or less and does not have the anthraquinone skeleton having the water-soluble group in the molecule, and in the second ink composition, dye solubility of the dye A is greater than dye solubilities of the dyes B and C, and dye solubility of the dye C is $10^{-3}$ or less.

10. The ink jet ink composition for sublimation transfer according to claim 1, wherein the water-soluble group of the dye A is at least one kind selected from a group consisting of an amino group and a hydroxyl group.

11. A method of manufacturing dyed products, comprising: attaching the ink jet ink composition for sublimation transfer according to claim 10 on an intermediate transfer medium using an ink jet method; and transferring a disperse dye included in the ink jet ink composition for sublimation transfer to a recording medium by heating in a state in which a surface of the intermediate transfer medium on which the ink jet ink composition for sublimation transfer is attached and a dye surface of the recording medium face each other.

12. The method of manufacturing dyed products according to claim 11, wherein a heating temperature in the transferring is 160.degree. C. to 220.degree. C.

13. An ink set, comprising: a first ink composition; and a second ink composition, wherein the first ink composition includes at least one kind of the ink jet ink composition for sublimation transfer according to claim 10, the second ink composition is an ink jet black ink composition for sublimation transfer including at least one kind selected from a group consisting of a dye A which is a disperse dye which has a molecular weight of 380 or less and an anthraquinone skeleton having a water-soluble group in a molecule, a dye B which is a disperse dye which has a molecular weight of 400 or greater, and a dye C, the dye C is a disperse dye which has a molecular weight of 380 or less and does not have the anthraquinone skeleton having the water-soluble group in the molecule, and in the second ink composition, dye solubility of the dye A is greater than dye solubilities of the dyes B and C, and dye solubility of the dye C is $10^{-3}$ or less.

14. A method of manufacturing dyed products, comprising: attaching the ink jet ink composition for sublimation transfer according to claim 1 on an intermediate transfer medium using an ink jet method; and transferring a disperse dye included in the ink jet ink composition for sublimation transfer to a recording medium by heating in a state in which a surface of the intermediate transfer medium on which the ink jet ink composition for sublimation transfer is attached and a dye surface of the recording medium face each other.

15. The method of manufacturing dyed products according to claim 14, wherein a heating temperature in the transferring is 160.degree. C. to 220.degree. C.

16. An ink set, comprising: a first ink composition; and a second ink composition, wherein the first ink composition includes at least one kind of the ink jet ink composition for sublimation transfer according to claim 1, the second ink composition is an ink jet black ink composition for sublimation transfer including at least one kind selected from a group consisting of a dye A which is a disperse dye which has a molecular weight of 380 or less and an anthraquinone skeleton having a water-soluble group in a molecule, a dye B which is a disperse dye which has a molecular weight of 400 or greater, and a dye C, the dye C is a disperse dye which has a molecular weight of 380 or less and does not have the anthraquinone skeleton having the water-soluble group in the molecule, and in the second ink composition, dye solubility of the dye A is greater than dye solubilities of the dyes B and C, and dye solubility of the dye C is $10^{-3}$ or less.

17. The ink set ink according to claim 16, wherein the dye C has the anthraquinone skeleton not having the water-soluble group in a molecule.

* * * * *